US005339974A

United States Patent [19]

Raghunathan

[11] Patent Number: 5,339,974

[45] Date of Patent: Aug. 23, 1994

[54] DOMESTIC COMPOSTERS

[75] Inventor: Narayan Raghunathan, Bolton, Canada

[73] Assignee: Norseman Plastics Limited, Rexdale, Canada

[21] Appl. No.: 952,610

[22] Filed: Sep. 28, 1992

[30] Foreign Application Priority Data

Aug. 28, 1992 [CA] Canada .............................. 2077183

[51] Int. Cl.[5] .............................................. F24J 2/00

[52] U.S. Cl. .................................. 220/4.26; 220/484; 220/908; 71/9

[58] Field of Search ...................... 220/4.26, 484, 908; 71/9, 14

[56] References Cited

U.S. PATENT DOCUMENTS

| | | | |
|---|---|---|---|
| 2,724,968 | 11/1955 | Greene | 220/484 X |
| 3,708,085 | 1/1973 | Bumpas | 220/484 |
| 3,916,456 | 11/1975 | Persson | 71/9 X |
| 4,105,412 | 8/1978 | Petzinger | 71/14 X |
| 4,153,176 | 5/1979 | Carson | 220/484 |
| 4,984,561 | 1/1991 | Warrington | 71/9 |

*Primary Examiner*—Steven M. Pollard

*Attorney, Agent, or Firm*—Weingarten, Schurgin, Gagnebin & Hayes

[57] ABSTRACT

A domestic composter of molded plastic has an upwardly tapered body comprising an upper and a lower half, with tongue and socket connectors such that the two halves may be firmly assembled together or separated without the use of tools. The upper half fits readily within the lower half, permitting transportation of the composter within a standard size automobile. The tapered construction enables multiples of the respective body portions to be nested, for economical bulk transportation. An access door is provided, having securing lugs that may be padlocked, and the removable lid of the composter may be rotated into a selectively variable position that precludes removal and affords ventilation control. The lid may be readily removed, or may be electively opened to a partial-access position for one-handed depositing of waste therein. A comprehensive vent system allows controlled cooling and ventilation while precluding access even to small animals such as mice. Screw-down earth anchors may be used to anchor the composter to the ground, or over a plain base plate.

12 Claims, 1 Drawing Sheet

DOMESTIC COMPOSTERS

TECHNICAL FIELD

This invention is directed to a composter for composting organic waste and in particular to a domestic composter that may be readily dis-assembled and re-assembled without use of tools, and may be nested to facilitate transportation.

BACKGROUND ART

The process of composting organic waste in order to achieve controlled decomposition thereof is well known, wherein valuable fertilizer may be prepared, and undesirable waste products, including grass and leaves conveniently disposed of.

Problems are encountered in the marketing of composters, due to the large containment volume normally required, which leads to a large, cumbersome structure.

In the prior art, in regard to collapsible containers, certain desirable characteristics have been achieved. Thus, UK Patent Application GB 2198410 A, published Jun. 15, 1988 shows a 2-part container for disposing of medical waste. The container, once assembled is virtually impossible to dismantle, and constitutes a leak-free assembly.

U.S. Pat. No. 1,286,021, Nov. 26, 1918 discloses a collapsible, corrugated barrel having a reinforcing cap locked to the body of the barrel, and utilizes a tie wire to secure segments of the barrel body together.

U.S. Pat. No. 1,521,108, Dec. 30, 1924 discloses a sheet metal knock down barrel of corrugated construction with integral hoop portions, the unassembled body panel portions of which may be shipped flat, in nested relation.

U.S. Pat. No. 4,105,412, Aug. 8, 1978 discloses a portable compost container having an elaborate ribbed body structure of cylindrical form.

U.S. Pat. No. 4,352,888, Oct. 5, 1982 discloses a plastic composter of square section. The flat sides of the container are joined by bead and socket joints, the container having upper and lower sections in locked relation.

U.S. Pat. No. DES 269,046, May 17, 1983 discloses a barrel composter, presumably of plastic, formed of three longitudinal, identical segments, each having lower access port for removal of composted material.

U.S. Pat. No. 4,984,561, Jan. 15, 1991, discloses a composter of asymmetrical arrangement having a lower, generally cylindrical half and a conical upper portion bolted thereto. The upper portion incorporates a solar collection chamber therewith.

DISCLOSURE OF THE INVENTION

The present invention provides a large capacity domestic composter structure for composting organic waste.

The composter casing comprises a lower half consisting of a light weight molded plastic body in the form of a truncated cone; an upper light weight molded body half consisting of a mating truncated cone, and tongue and slot connectors interconnecting the two halves, that may be readily assembled without benefit of tools to provide a strong, permanent assembly, and yet may be readily dis-assembled without use of tools by judicious, laterally applied hand slaps. The size of the assembled composter may make it virtually impossible to transport in a regular sized automobile, when assembled. However, the upper half of an individual composter may be readily inverted and stowed within the lower half, to facilitate ready transportation thereof within an automobile.

In one embodiment the lower half has a diameter of thirty-three inches at the base, a diameter of twenty-six inches at the connector flange; and a height of eighteen inches. The upper half has a flange diameter of twenty-six inches, a shoulder diameter of twenty-three inches and a height of seventeen inches, and readily rests, inverted.

Alternatively, a number of upper halves may be nested, as may a number of lower halves, to facilitate economical bulk transportation of the composters.

The removable access hatch to the base of the composter is provided with a security lug, permitting padlocking or wiring closed of the hatch, against unauthorized entry.

The composter lid, which is of tapered construction to facilitate nesting of a number of lids, is shaped to permit direct on/off application and removal, and in the open position may also be partially raised at one side while still latched to the opposite side of the composter body, to facilitate one handed access thereto, when depositing organic waste matter.

The lid also incorporates controlled columnary-venting, being adjustably rotatable about its polar axis relative to the composter body whereby, in co-operation with a series of venting slots in the collar of the composter body upper portion, the extent of columnary-venting of the composter may be selectively controlled.

The removable lower access door slides on to a pair of laterally located side edge flanges, the conically curved shape of the door imparting resilience thereto, whereby the door tends to grip the side flanges, thereby staying in a raised or partially raised position, to facilitate removal of matured compost from the bottom of the composter.

A matching pair of lugs at the top of the access door and the adjacent top edge of the door housing permits the insertion of a padlock or tie wire, to retain the door closed against unauthorized access by such as children or animals.

BRIEF DESCRIPTION OF THE DRAWINGS

Certain embodiments of the invention are described by way of illustration, without limitation of the invention thereto, reference being made to the accompanying drawings, wherein.

BEST MODE OF CARRYING OUT THE INVENTION

Figure 1:
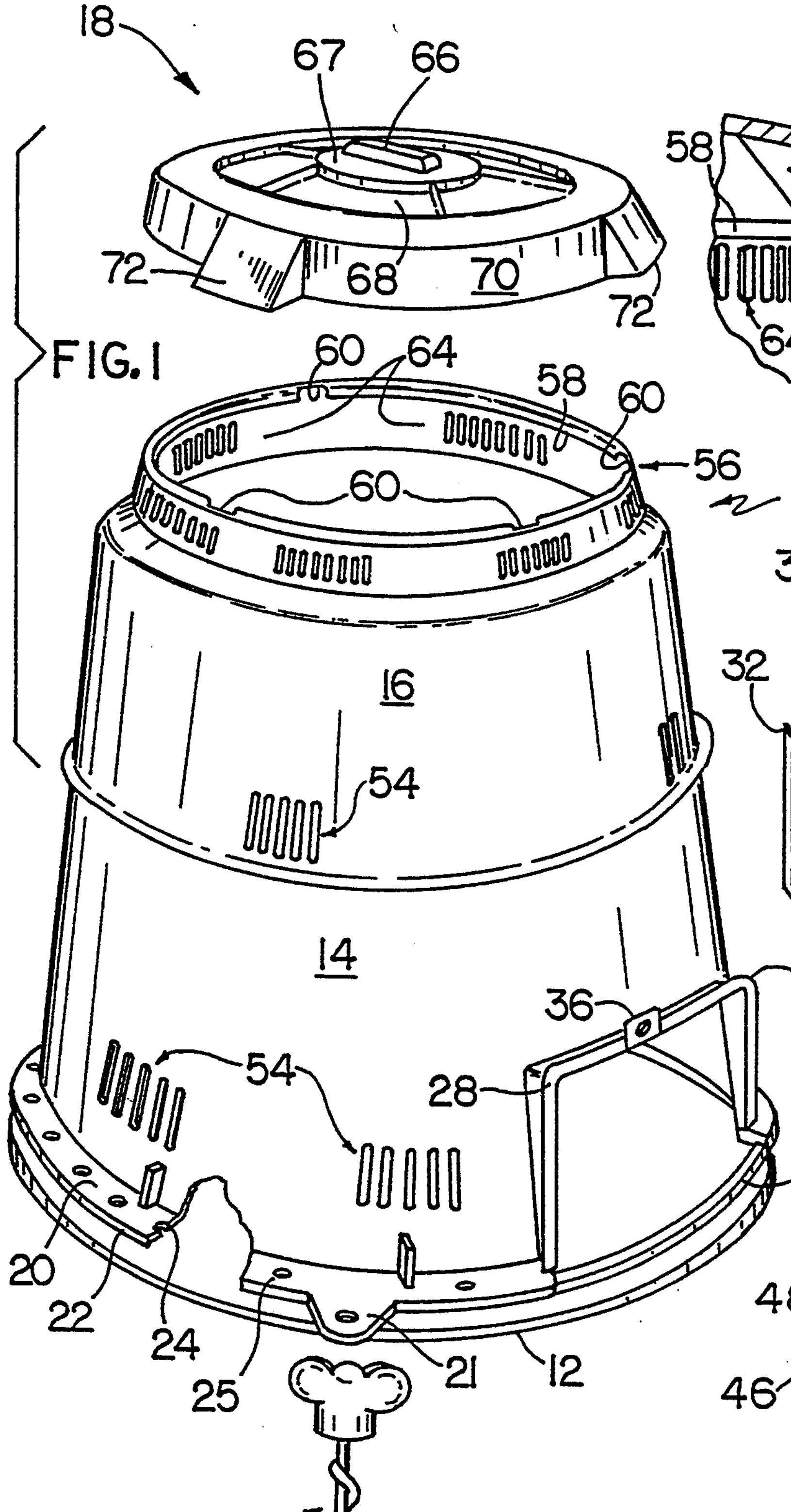
FIG. 1 is a front perspective view of an assembled composter in accordance with the invention, having a portion of the base thereof broken away, with the lid elevated thereover, and showing an optional base plate.
Figure 4:
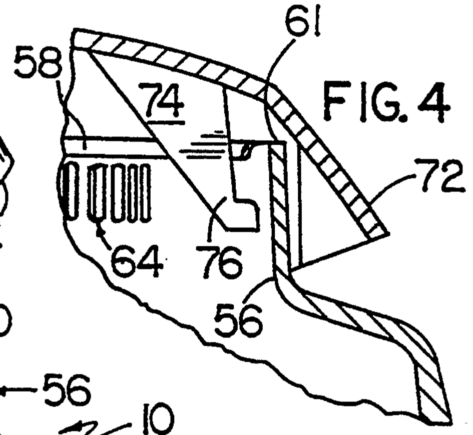
FIG. 4 is a transverse section of a portion of the lid and the adjoining collar portion of the composter body, with which it cooperates.

Referring to FIG. 1, the composter assembly 10 includes a base plate 12 (which is optional), a lower body half 14, and upper body hale 16 and lid 18.

The lower half 14 has a base flange 20 of inverted L-section, the outer leg portion 22 spacing the perforated flange portion 24 clear of the ground, or clear of the base plate 12 (if used). This enables the base perforations 25 to "breath" and ventilate the lower portion of the composter 10.

Figure 2:
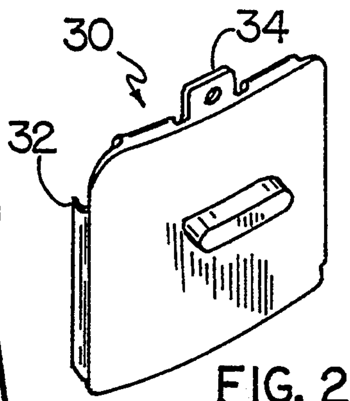
FIG. 2 is a like perspective view of the composter access door.

The lower half 14 has a flanged access 26, the peripheral side flanges 28 thereof receiving the slidable hatch 30 (FIG. 2). The hatch 30 has side slide ways 32 of C-shaped profile, into which the side flanges 28 may enter. The curved shape of the hatch 30 imparts lateral resilience thereto, whereby the slide ways 32 bear frictionally on to the side flanges 28, so that the hatch 30 stays in any selected position. A perforated security lug 34 on the hatch 30 can be aligned with a like security lug 36 on the access 26, so that the hatch 30 can be readily padlocked or wired closed.

A closure band portion 20' of reduced section serves to maintain the base flange 20 in the round, until installed. The band portion 20' may then be removed.

Figure 3:
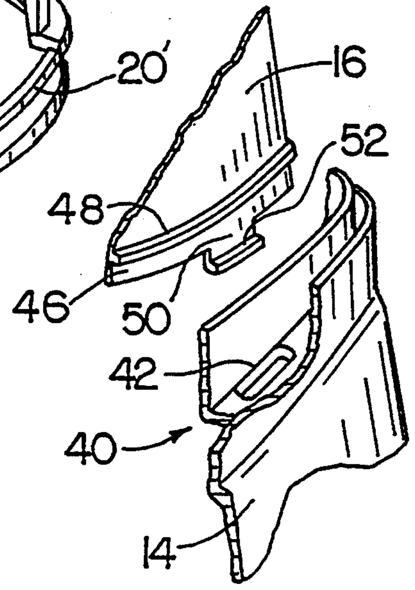
FIG. 3 is a downward perspective view of a portion of the upper and the lower body, showing a tongue and socket connector and the associated flanges.
Figure 5:
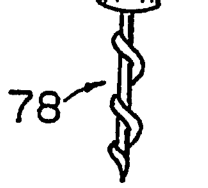
FIG. 5 is a perspective view of a crew-down earth anchor for use with the composter.

Referring to FIG. 3, the composter lower half 14 has a U-section peripheral flange 40, with a number of socket slots 42 in the light of the U-section.

The composter Upper half 16 has a peripheral flange 46, which fits into the U-section of flange 40. The flange 46 is bounded by a peripheral bead 48, to limit its penetration, and has a number of downwardly projecting tongues 50 which fit into the slots 42. The tongues 50 each includes a protruding tip 52, which tip 52 extends through the corresponding slot 42, to engage the underside thereof, thereby locking the upper body half 16 into assembled, locked relation with the lower body half 14. The assembly resists dis-assembly under normal usage, and the composter 10 may be moved about when in the assembled condition. However, the application of a sharp slap to the upper half 16 can dislodge the tongues 50 within the slots 42, permitting ready disassembly of upper half 16 from the lower half 14.

Both lower half 14 and upper half 16 include multiple ventilation slot arrangements 54 wherein the slots are sufficiently narrow to exclude mice.

The upper body half 16 includes a top collar portion 56 with an inturned deep peripheral lip 58, having four recesses 60 therein, arranged at 90° from each other. Each recess 60 includes a rim edge 61.

Intermediate the recesses 60, the collar portion 56 has multiple ventilation slot arrangements 64.

The lid 18 has a central raised handle portion 66 mounted upon a boss 67 supported by raised rib portions 68.

The peripheral skirt 70 of lid 18 has four flares 72 angled therefrom. Projecting downwardly from lid 18 and centred on each flare 72 and spaced inwardly therefrom is a catch member 74. The catch member 74 has an outwardly projecting toe portion 76.

In use, with the lid 18 oriented to align the four catch members 74 with the respective recesses 60, the toe portions 76 can clear the rim edges 61 of the respective recesses 60, permitting the simple lifting off of the lid 18 from the upper body half 16.

However, in that same aligned, oriented position, if the lid 18 is couted open by one of the flares 72, the toe portion 76 of the oppositely located latch member 74 will securely engage beneath the adjacent rim edge 61, as the lid 18 is raised. The engaged latch member 74 will permit the raising of opposite side of the lid by about six inches or so, for the insertion of organic waste into the top of the composter 10.

The lid 18, when in a closed condition, may be rotated about its polar axis, wherein the toe portion 76 of the latch members 74 will underlie the lid inner lip 58, preventing removal of the lid. In this rotated condition the flares 72 can be brought into any desired degree of registry with the ventilation slots 64 of the collar portion 56.

Thus, the extent of outside ventilation of the top half 16 of composter 10 can be readily adjusted.

It will be understood that the use of a base plate 12 may be optional, depending in part upon the nature of the ground on which the composter 10 is to stand.

Screw-down earth anchor bolts 78, which are preferably of plastic may be inserted through the flange portions 21, with or without the presence of a base plate 12.

The closure band portion 20' facilitates maintaining the circular shape of the flange 20 until the composter 10 is bolted in location by way of anchor bolts 78. The band portion 20' may then be broken away and discarded.

INDUSTRIAL APPLICABILITY

The subject composter is well suited to mass production by molding processes, and meets a long-felt domestic need.

What is claimed is:

1. A domestic composter structure for composting organic waste, having an upwardly tapered lower portion, an upwardly tapered upper portion sized, when reversed to fit within said lower portion to enable shipment of the composter within a passenger car when dis-assembled, said lower portion having an upper edge joint portion and said upper portion having a lower edge joint portion, said joint portions when solely manually assembled forming a locked joint composter construction.

2. The composter structure as set forth in claim 1, said joint portions being manually dis-assemblable without the use of tools.

3. The composter structure as set forth in claim 2, the lower and upper ends, respectively of said lower and upper portions having ventilation apertures therein.

4. The composter structure as set forth in claim 1 including lid means enclosing said upper portion, including catch means, in use to retain said lid when in a first oriented position, and in a second oriented condition to permit selective full or partial removal of said lid.

5. The composter structure as set forth in claim 4, said composter upper portion having an inwardly directed upper peripheral lip having a plurality of recesses therein for passage of said catch means therethrough.

6. The composter structure as set forth in claim 5, said lid means having a plurality of ventilation louvers, located adjacent said catch means, in use to bring said catch means into engaged, latched relation with said composter upper portion, on canting of said lid to a partially open position.

7. The composter structure as set forth in claim 4, said composter upper portion including a top collar portion having a plurality of ventilation apertures therein; said lid means having a plurality of flares selectively movable into a desired degree of registry with said collar ventilation apertures on rotation of said lid means about the polar axis thereof, for controlled ventilation of the composter.

8. The composter structure as set forth in claim 1, including a supported flange located at the bottom edge of said lower portion, and ventilation aperture means in said supported flange, in use to admit ventilation air to the interior of said structure.

9. The composter structure as set forth in claim 1, said lower portion including an access hatch, and securable door means therefor.

10. The composter structure as set forth in claim 1, said upper portion and said lower portion each having cross ventilation apertures therein, said apertures being laterally sized to substantially preclude the access of rodents therethrough.

11. The composter structure as set forth in claim 1, said edge joint portions including a peripheral channel of substantially U-form cross-section, to receive an adjacent peripheral edge portion of the other composter portion in entered relation therein, said other portion having a plurality of tongue connectors for entry within said U-form section; said U-form section having a plurality of socket apertures therein to receive said tongue connectors in entered relation therein.

12. The composter structure as set forth in claim 11, at least some of said tongue connectors each including a tip portion to engage a said socket aperture, to lock said upper portion to said lower portion; said tongue connectors, in use being manually disengagable from said socket apertures on the application of a moderate lateral slap against said composter upper portion.

* * * * *